(12) United States Patent
Nodera et al.

(10) Patent No.: US 6,498,228 B1
(45) Date of Patent: Dec. 24, 2002

(54) FLAME-RETARDANT POLYCARBONATE RESIN COMPOSITION AND MOLDED PRODUCT

(75) Inventors: Akio Nodera, Ichihara (JP); Shigeki Kuze, Ichihara (JP); Tsuyoshi Murakami, Ichihara (JP); Naoki Mitsuta, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/868,919

(22) PCT Filed: Jan. 7, 2000

(86) PCT No.: PCT/JP00/00043

§ 371 (c)(1),
(2), (4) Date: Oct. 16, 2001

(87) PCT Pub. No.: WO00/42106

PCT Pub. Date: Jul. 20, 2000

(30) Foreign Application Priority Data

| Jan. 11, 1999 | (JP) | 11-003911 |
| Jan. 27, 1999 | (JP) | 11-018023 |
| Feb. 3, 1999 | (JP) | 11-026568 |

(51) Int. Cl.$^7$ ............................................. C08G 64/02
(52) U.S. Cl. ........................................ 528/196; 528/198
(58) Field of Search ................................. 528/196, 198

(56) References Cited

U.S. PATENT DOCUMENTS

| 5,416,186 A | 5/1995 | Oshino et al. |
| 5,852,156 A | 12/1998 | Hachiya et al. |

FOREIGN PATENT DOCUMENTS

| JP | 5-156000 | | 6/1993 |
| JP | 7-53709 | | 2/1995 |
| JP | 7-316411 | | 12/1995 |
| JP | 9-70852 | * | 3/1997 |
| JP | 9-100407 | * | 4/1997 |
| JP | 9-279006 | | 10/1997 |
| JP | 9-302044 | | 11/1997 |
| JP | 2000-72962 | | 3/2000 |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

Disclosed are a flame-retardant polycarbonate resin composition comprising, as the essential ingredients, (A) a polycarbonate resin, (B) a specific styrenic resin, and (C) a specific phosphate compound, and its moldings. Containing no halogen, the resin composition and its moldings have good flame retardancy, impact strength, heat-resistant stability, thermal aging resistance, and wet heat resistance.

21 Claims, No Drawings

FLAME-RETARDANT POLYCARBONATE RESIN COMPOSITION AND MOLDED PRODUCT

TECHNICAL FIELD

The present invention relates to a flame-retardant polycarbonate resin composition, precisely to flame-retardant polycarbonate resin composition and moldings having the advantages of impact resistance, in-line heat stability, aging resistance and recyclability. The invention also relates to flame-retardant polycarbonate resin composition and moldings having the advantages of impact resistance, weld strength and good appearance with few weld lines appearing on their surfaces, and capable of being well colored in dark color, and to flame-retardant polycarbonate resin composition and moldings having the advantages of flame retardancy, impact resistance, stable physical properties even in high-temperature and high-humidity atmospheres, and improved recyclability.

BACKGROUND ART

As having the advantages of impact resistance, heat resistance and good electric properties, polycarbonate resins have many applications in various fields of, for example, OA (office automation) appliances, information and communication appliances, other electric and electronic appliances for industrial use and household use, automobile parts and building materials. As a rule, polycarbonate resins are self-extinguishable. However, in some fields of typically OA appliances, information and communication appliances, and other electric and electronic appliances for industrial use and household use, required are polycarbonate resins having more improved flame retardancy.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection from discarded and incinerated wastes, the market requires flame retardation with non-halogen flame retardants. As non-halogen flame retardants, phosphorus-containing organic flame retardants, especially organic phosphate compounds may be added to polycarbonate resin compositions, for which various methods have been proposed. Such flame retardants, organic phosphate compounds serve also as a plasticizer, and polycarbonate resin compositions containing them exhibit excellent flame retardancy.

There are some problems with polycarbonate resins in that they require high molding and working temperatures and their melt fluidity is low. Therefore, the molding temperature for polycarbonate resins is relatively high, and when various additives are added to the resins, there occurs still another problem in that the thermal stability of the molding resins is lowered and that the resins could not sufficiently exhibit their properties. On the recent market, moldings for parts and housings of electric and electronic appliances such as duplicators, facsimiles and telephones are required to have complicated shapes with local projections or depressions for, for example, ribs or bosses and to have openings, and are also required to be lightweight and thin-walled from the viewpoint of resources saving. For these reasons, desired are polycarbonate resin compositions having improved melt fluidity, or that is, having improved injection moldability. Various polycarbonate resin compositions having enhanced moldability have heretofore been proposed, to which are added (rubber-modified) styrenic resins in consideration of the physical properties such as impact resistance of the moldings of the compositions.

Compositions of polycarbonate resins to which are added non-halogen phosphate compounds serving as a flame retardant, and those to which are added (rubber-modified) styrenic resins such as acrylonitrile-butadiene-styrene resins (ABS resins), rubber-modified polystyrene resins (HIPS resins) or acrylonitrile-styrene resins (AS resins) for increasing the melt fluidity of the compositions, are known as polymer alloys, and have many applications in the field of various moldings as having good heat resistance and impact resistance.

The ABS resin-containing compositions have improved melt fluidity and impact resistance, but their toughness is often poor. The rubber-modified polystyrene resin (HIPS)-containing compositions also have improved melt fluidity and impact resistance. As compared with the ABS resin-containing compositions, the HIPS-containing compositions have higher toughness if the rubber content of HIPS therein is lowered. HIPS having a lowered rubber content does not lower the toughness and the heat resistance of the resin compositions containing it, but lowers the impact resistance thereof. This is another problem with HIPS.

In order to make polycarbonate resins or their compositions containing a (rubber-modified) styrenic resin and having good melt fluidity have good flame retardancy by adding thereto a phosphate compound, a relatively large amount of the compound must be added to them. Though its flame-retarding ability is good, the phosphate compound often cause some problems when added to polycarbonate resins or their compositions. For example, it is said that phosphate compounds adhere to the molds used for molding resins or resin compositions containing them, and, in addition, phosphate compounds lower the impact strength of resin moldings or yellows them when the resin moldings are kept heated, or left in high-temperature high-humidity atmospheres, or recycled. A composition comprising a polycarbonate resin, a rubber-modified polystyrene resin and a phosphate compound has good flame retardancy and impact resistance, which, however, depends on the rubber content of the rubber-modified polystyrene resin in the composition. When the heat resistance and the toughness of the resin composition is kept on a desired level, the impact resistance thereof is often insufficient. The flame-retardant polycarbonate resin compositions mentioned above are molded in a mode of injection molding, and their moldings are much used for housings of OA appliances, etc. In general, the moldings are colored in dark color such as gray or black, for which is used a colorant comprising, as the essential ingredient, carbon black.

Many of the moldings are thin-walled and have complicated shapes, and they are welded, depending on the shape of the molds used. When welded, the appearance of the welded part is often poor and the weld strength is often low. The problem is especially serious with resin compositions comprising a polycarbonate resin and a rubber-modified polystyrene resin and containing a phosphate compound.

When a phosphate compound is added to polycarbonate resins for making them have flame retardancy, it is generally liquid at room temperature or has a low melting point. However, a relatively large amount of such a phosphate compound must be added to polycarbonate resins for making them have flame retardancy, it is often problematic in that the phosphate compound added thereto blooms resin moldings and lowers the heat resistance and the impact resistance of resin moldings. To solve the problem with such a phosphate compound that blooms resin moldings and lowers the heat resistance of resin moldings, for example, Japanese Patent Laid-Open No. 228426/1994 discloses a method of combining (A) a polyphenylene-ether resin or a polycarbonate resin, (B) a high-viscosity, alkyl-substituted aromatic phosphate compound having a specific structure, and (C) a triphenyl phosphate.

Japanese Patent Laid-Open No. 179715/1995 discloses a flame-retardant resin composition comprising (A) from 1 to 99 parts by weight of a polycarbonate resin, (B) from 1 to 99 parts by weight of a rubber-reinforced resin, and (C) from 0.1 to 30 parts by weight, relative to 100 parts by weight of (A) and (B), of an organic phosphorus compound having a melting point of not lower than 120° C. Japanese Patent Laid-Open No. 12867/1996 discloses a thermoplastic resin composition comprising a resin mixture of from 50 to 98% by weight of (A) an aromatic polycarbonate and from 2 to 50% by weight of (B) an ABS resin and/or (C) an AS resin, and containing from 0.01 to 5 parts by weight, relative to 100 parts by weight of the resin mixture, of (D) a fluororesin and/or a silicone, and from 1 to 40 parts by weight, relative to the same, of (E) a high-melting-point phosphate compound. To solve the problem noted above, these contain a high-viscosity or high-melting-point phosphate compound serving as a flame retardant, and the compound therein is expected to be effective in some degree.

In Japanese Patent Laid-Open No. 100405/1997, proposed is a flame-retardant resin composition comprising (A) a polycarbonate resin, (B) a rubber-reinforced resin such as ABS, (C) a phosphate serving as a flame retardant, and (D) a monomer or oligomer of a phenolic OH-containing polymer substance. However, this is problematic in that bisphenol A for the component (D) therein worsens the physical properties of the resin composition in high-temperature high-humidity atmospheres.

Some examples of compositions comprising a polycarbonate resin, a rubber-modified polystyrene resin and a phosphate compound are known. For example, in Japanese Patent Laid-Open No. 110092/1998, proposed is a composition that contains a rubber-modified polystyrene resin having a rubber polymer content of from 15 to 25% by weight, a volume-average particle size of from 0.3 to 5.0 µm and a gel content of from 15 to 70% by weight, and a block copolymer comprising aromatic vinyl blocks and conjugated diene compound blocks. In Japanese Patent Laid-Open No. 151239/1997, proposed is a composition of good platability, which contains a rubber-reinforced vinylic resin (ABS resin) containing from 1 to 5% by weight of small-size rubber particles having a weight-average particle size of from 0.1 µ to less than 0.3 µ, and from 3 to 10% by weight of large-size rubber particles having a weight-average particle size of from 0.3 µ to less than 2 µ. However, these laid-open specifications have no description relating to the colorability of the compositions with pigment, to the appearance of welded part of moldings and to the weld strength of moldings.

Further, for example, Japanese Patent Laid-Open No. 55145/1986 describes a thermoplastic resin composition comprising components of (A) an aromatic polycarbonate resin, (B) an ABS resin, (C) an AS resin, (D) a halogen compound, (E) a phosphate, and (F) a polytetrafluoroethylene. Japanese Patent Laid-Open No. 32154/1990 describes a flame-retardant, high-impact polycarbonate molding composition comprising components of (A) an aromatic polycarbonate resin, (B) an ABS resin, (C) an AS resin, (D) a phosphate, and (E) a polytetrafluoroethylene.

Anyhow, in these proposals, the latitude in using the phosphate compound is limited. When such a specific phosphate compound is selectively used in the resin compositions proposed, it could solve the problem of improving the molding environment in which the resin compositions are molded and the problem of improving the appearance of the resin moldings, but, at present, could not totally solve the problem of improving the dispersibility and the melt kneadability of the resin compositions and the problem of improving the impact strength, the aging resistance, especially the wet heat resistance and the recyclability of the resin moldings.

With the recent tendency toward environmental protection and energy and resources saving, recycling resin moldings is desired. Specifically, in repeated re-melting and re-mixing used resin moldings for recycling them, it is desired that the physical properties of the recycled moldings are degraded little and that the recycled moldings are yellowed little.

Accordingly, also desired are flame-retardant polycarbonate resins that are stable even in high-temperature high-humidity atmospheres, or that is, those highly resistant to hydrolysis. On the other hand, known is a technique of adding an inorganic filler such as talc to flame-retardant polycarbonate resins, for example, in Japanese Patent Laid-Open Nos. 126510/1995 and 48912/1997. In these, the inorganic filler added to flame-retardant polycarbonate resins is for improving the heat resistance and the toughness of the resin moldings, and its amount is generally at least 5% by weight, especially at least 10% by weight to attain the intended object. However, even when about 5% by weight of talc is added to 100 parts by weight of the resin component, it causes a serious problem in that the impact strength of the resin moldings is greatly lowered.

The present invention has been made in consideration of the above-mentioned viewpoints, and includes three aspects. The first aspect of the invention is to add a phosphate compound to a polycarbonate resin to make the resin resistant to flames, and its object is to provide a flame-retardant polycarbonate resin composition having good flame retardancy and capable of being molded into moldings having good impact resistance, good aging resistance including heat resistance and wet heat resistance, and good recyclability, and to provide moldings of the composition. The second aspect of the invention is to add a phosphate compound to a composition comprising a polycarbonate resin and a rubber-modified polystyrene resin to thereby make the resin composition resistant to flames, and its object is to provide a flame-resistant polycarbonate resin composition having good flame retardancy and capable of being molded into moldings having good impact resistance, high weld strength, good appearance and gloss with few weld lines, and good colorability in dark color such as black, dark gray, dark blue and light gray, and to provide moldings of the composition. The third aspect of the invention is to add a phosphate compound to a polycarbonate resin to make the resin resistant to flames, while adding thereto a styrenic resin to improve the moldability of the resin composition, and its object is to provide a polycarbonate resin composition having good flame retardancy and capable of being molded into moldings having good aging resistance including heat resistance and moisture resistance, and having good recyclability in repeated heat cycle of re-melting and re-molding, and to provide moldings of the composition.

DISCLOSURE OF THE INVENTION

We, the present inventors have assiduously studied and, as a result, have completed the present invention including the first to third aspects specifically mentioned below. In the first aspect of the invention, we have assiduously studied how to improve the moldability and the heat resistance of a flame-retardant polycarbonate resin containing, as a flame retardant, a phosphate compound in order that the moldings of the resin composition can be well used in any severe condition. As a result, we have found that, in a polycarbonate resin composition containing, as a flame retardant, a phosphate compound, when the content of a specific component is specifically defined, then the moldability and the heat resistance of the resin composition are improved, and, in addition, the moldings of the composition are deteriorated little and are yellowed little even when used under heat or in high-temperature high-humidity atmospheres and even when recycled in repeated heat cycle of re-melting and re-molding them. On the basis of these findings, we have completed the first aspect of the invention.

Specifically, the first aspect of the invention includes the following (1) to (7):

(1) A flame-retardant polycarbonate resin composition comprising (A) from 5 to 100% by weight of a polycarbonate resin and (B) from 0 to 95% by weight of a styrenic resin, and (C) from 1 to 30 parts by weight, relative to 100 parts by weight of the resin, of a phosphate compound, in which the amount of phenols extracted in Soxhlet extraction with a solvent of acetone is at most 300 ppm.

(2) The flame-retardant polycarbonate resin composition of above (1), wherein the terminal hydroxyl ratio to the terminals of the polycarbonate resin falls between 0.5 and 20 mol %.

(3) The flame-retardant polycarbonate resin composition of above (1) or (2), wherein the resin comprises from 20 to 95% by weight of the polycarbonate resin (A) and from 5 to 80% by weight of a rubber-modified styrenic resin for the component (B).

(4) The flame-retardant polycarbonate resin composition of any of above (1) to (3), which further contains (D) from 0.02 to 5 parts by weight, relative to 100 parts by weight of the resin (A) and (B), of a fluoro-olefin resin.

(5) The flame-retardant polycarbonate resin composition of any of above (1) to (4), which further contains (E) from 0.2 to 30 parts by weight, relative to 100 parts by weight of the resin (A) and (B), of a core/shell type, grafted rubber-like elastomer.

(6) A molding of the flame-retardant polycarbonate resin composition of any of above (1) to (5).

(7) An injection molding of the flame-retardant polycarbonate resin composition of any of above (1) to (5), for housings or parts of electric and electronic appliances.

In the second aspect of the invention, we have assiduously studied how to improve the moldability, the impact resistance, the appearance and the weldablity of a flame-retardant polycarbonate resin composition containing, as a fluidity improver, a rubber-modified polystyrene resin and containing, as a flame retardant, a phosphate compound. As a result, we have found that, in a polycarbonate resin composition containing a rubber-modified polystyrene resin and containing, as a flame retardant, a phosphate compound, when the property and the morphology of the rubber-modified polystyrene are specifically defined, then the moldability of the resin composition is well improved not lowering the toughness of the moldings of the composition, and, in addition, the impact resistance of the moldings is also improved, the moldings are easily colored in dark color, and the weldability and the surface gloss of the moldings are good. On the basis of these findings, we have completed the second aspect of the invention.

Specifically, the second aspect of the invention includes the following (1) to (6):

(1) A flame-retardant polycarbonate resin composition comprising (A) from 60 to 99% by weight of a polycarbonate resin and (B) from 1 to 40% by weight of a rubber-modified polystyrene resin, and (C) from 1 to 30 parts by weight, relative to 100 parts by weight of the resin, of a phosphate compound, in which the rubber-modified polystyrene resin (B) has (a) an area-average rubber particle size of from 0.1 to 2.5 $\mu$m, (b) a swelling index of from 10 to 20, and (c) a gel content of from 15 to 25% by weight.

(2) The flame-retardant polycarbonate resin composition of above (1), which further contains (D) from 0.02 to 5 parts by weight, relative to 100 parts by weight of the resin (A) and (B), of a fluoro-olefin resin.

(3) The flame-retardant polycarbonate resin composition of above (1) or (2), which further contains (E) from 0.2 to 30 parts by weight, relative to 100 parts by weight of the resin (A) and (B), of a core/shell type, grafted rubber-like elastomer.

(4) A molding of the flame-retardant polycarbonate resin composition of any of above (1) to (3).

(5) An injection molding of the flame-retardant polycarbonate resin composition of any of above (1) to (3), for housings or parts of electric and electronic appliances.

(6) The molding of above (4) or (5), of which the L value of the surface is at most 80.

In the third aspect of the invention, we have assiduously studied how to improve the moldability, the heat resistance and the moisture resistance of a flame-retardant polycarbonate composition containing, as a flame retardant, a phosphate compound. As a result, we have found that, when a specifically defined amount of a specific additive is selectively added to a resin composition comprising a polycarbonate resin and a styrenic resin, with adding a phosphate compound thereto, then the impact resistance, the aging resistance and the recyclability of the resin composition and its moldings are well improved, not lowering the flame retardancy the composition and moldings. On the basis of these findings, we have completed the third aspect of the invention.

Specifically, the third aspect of the invention includes the following (1) to (7):

(1) A flame-retardant polycarbonate resin composition comprising (A) from 70 to 95% by weight of a polycarbonate resin and (B) from 5 to 30% by weight of a styrenic resin, and (C) from 2 to 20 parts by weight, relative to 100 parts by weight of the resin, of a phosphate compound and (D) from 0.1 to 4 parts, relative to the same, of a tabular inorganic filler.

(2) The flame-retardant polycarbonate resin composition of above (1), wherein the tabular inorganic filler is talc having a mean particle size of from 0.2 to 2 $\mu$m.

(3) The flame-retardant polycarbonate resin composition of above (1) or (2), wherein the phosphate compound is a condensed phosphate compound having a resorcinol or hydroquinone structure and a phenylene-ether structure.

(4) The flame-retardant polycarbonate resin composition of any of above (1) to (3), which further contains (E) from 0.05 to 5 parts by weight, relative to 100 parts by weight of the resin (A) and (B), of a fluoro-olefin resin.

(5) The flame-retardant polycarbonate resin composition of any of above (1) to (4), which further contains (F) from 1 to 30 parts by weight, relative to 100 parts by weight of the resin (A) and (B), of a core/shell type, grafted rubber-like elastomer.

(6) A molding of the flame-retardant polycarbonate resin composition of any of above (1) to (5).

(7) An injection molding of the flame-retardant polycarbonate resin composition of any of above (1) to (5), for housings or parts of electric and electronic appliances.

BEST MODES OF CARRYING OUT THE INVENTION

Embodiments of the invention are described below, in order from the first aspect to the others.

First Aspect of the Invention:

The constituent components (A) to (C) of the flame-retardant polycarbonate resin composition of the first aspect of the invention (this will be simply referred to as "the invention" in this section) are described.

(A) Polycarbonate Resin (PC):

The polycarbonate resin (PC) serving as the component (A) in the flame-retardant polycarbonate resin composition of the invention is not specifically defined, and may be any and every one known in the art. Generally used herein are aromatic polycarbonates to be produced from diphenols and carbonate precursors. For example, herein used are polycarbonates as produced by reacting a diphenol and a carbonate precursor in a solution method or in a melt method, such as those produced through reaction of a diphenol and phosgene or through interesterification of a diphenol and a diphenyl carbonate.

Various diphenols are usable, typically including 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) sulfoxide, bis (4-hydroxyphenyl) ether, and bis (4-hydroxyphenyl) ketone.

As the diphenols for use herein, preferred are bis(hydroxyphenyl)alkanes, especially those consisting essentially of bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, α,α',α"-tris(4-hyroxyphenyl)-1,3,5-triisopropylbenzene, phloroglucine, trimellitic acid, and isatin-bis (o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer having polycarbonate segments and polyorganosiloxane segments, or a polycarbonate resin containing a copolymer of that type. It may also be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention. Preferably, the polycarbonate resin for the component (A) in the invention does not substantially contain a halogen in the structure. In view of its mechanical strength and moldability, the polycarbonate resin preferably has a viscosity-average molecular weight of from 10,000 to 100,000, more preferably from 11,000 to 40,000, even more preferably from 12,000 to 25,000.

Also preferably, the terminal hydroxyl ratio to the terminals of the polycarbonate resin for use in the invention is at least 0.5 mol %, more preferably from 0.5 to 20 mol %. The hydroxyl group in the polycarbonate resin contributes toward improving the miscibility of the polycarbonate resin with the phosphate compound in the resin composition, especially improving the miscibility of the polycarbonate resin and the styrenic resin with the phosphate compound therein, therefore reducing failed moldings with layer peeling, and improving the physical properties, such as the impact strength, the elongation and the weld strength of the resin moldings. On the other hand, however, the hydroxyl group often has a negative influence on the heat resistance of the resin composition. Accordingly, the terminal hydroxyl ratio to all terminals of the polycarbonate resin preferably falls between 0.5 and 20 mol % from the total viewpoint.

Also preferably, the low-molecular weight component of the polycarbonate resin, which is extracted in Soxhlet extraction with a solvent of acetone, is generally at most 10% by weight. In addition, it is desirable that the halogen content, generally the chlorine content of the polycarbonate resin is small, generally at most 200 ppm, preferably at most 100 ppm. The low-molecular weight component and the chlorine content of the resin can be comprehensively controlled to the desired range by selecting the production method (solution method, melt method) and by controlling the production condition including the condensation condition, and also the washing condition, the pelletizing condition, the drying condition, the melt-kneading condition and the additive formulation.

(B) Styrenic Resin:

The styrenic resin for the component (B) of the flame-retardant polycarbonate resin composition of the invention may be a polymer prepared through polymerization of a monomer or monomer mixture of from 20 to 100% by weight of a monovinylic aromatic monomer such as styrene or α-methylstyrene, from 0 to 60% by weight of a vinyl cyanide-type monomer such as acrylonitrile or methacrylonitrile, and from 0 to 50% by weight of any other vinylic comonomer copolymerizable with those monomers, such as maleimide or methyl (meth)acrylate. The polymer includes, for example, polystyrenes (GPPS), and acrylonitrile-styrene copolymers (AS resins).

For the styrenic resin, preferred are rubber-modified styrenic resins. The rubber-modified styrenic resins are preferably high-impact styrenic resins produced through grafting polymerization of rubber with at least styrenic monomers. The rubber-modified styrenic resins include, for example, high-impact polystyrenes (HIPS) produced through polymerization of rubber such as polybutadiene with styrene; ABS resins produced through polymerization of polybutadiene with acrylonitrile and styrene; MBS resins produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of rubber for use herein include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

(C) Phosphate Compound:

The phosphate compound is preferably a non-halogen phosphate compound, for example, represented by the following formula (1):

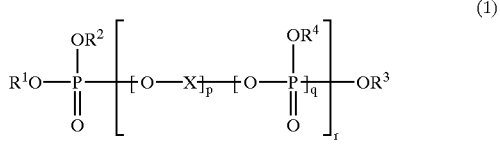

(1)

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups. The substituents for the substituted groups include, for example, alkyl groups, alkoxy groups, aryl groups, aryloxy groups, and arylthio groups. These substituents may be combined to give arylalkoxyalkyl groups, or may be bonded, for example, via oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, and groups as derived from bisphenols of polycyclic phenols.

Preferred are groups derived from bisphenol A, hydroquinone, resorcinol, diphenylmethane, dihydroxydiphenyl, and dihydroxynaphthalene.

The phosphate compound may be a monomer, an oligomer, a polymer or their mixture. Concretely, it includes, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, tributyl phosphate, bisphenol A bisphosphate, hydroquinone bisphosphate, resorcinol bisphosphate, resorcinol-diphenyl phosphate, trihydroxybenzene triphsophate, and cresyl-diphenyl phosphate, and their substituted derivatives and condensed derivatives.

Commercially-available, non-halogen phosphates that are preferably used for the component (C) of the flame-retardant polycarbonate resin composition of the invention are, for example, TPP [triphenyl phosphate], TXP [trixylenyl phosphate], CR-733S [resorcinol bis(diphenyl phosphate)], PX200 [1,3-phenylene-tetrakis(2,6-dimethylphenyl) phosphate], PX201 [1,4-phenylene-tetrakis(2,6-dimethylphenyl) phosphate], and PX202 [4,4'-biphenylene-tetrakis(2,6-dimethylphenyl) phosphate], all from Daihachi Chemical Industry.

The formulation of the components (A) to (C) in the invention is described. In the invention, the styrenic resin of the component (B) has no direct relation to the flame retardancy of the resin composition, and may be in the resin composition when the melt fluidity of the polycarbonate resin therein must be improved. The blend ratio of the polycarbonate resin (A) to the styrenic resin (B) may be generally such that the polycarbonate resin (A) accounts for from 5 to 100% by weight, preferably from 30 to 95% by weight, more preferably from 60 to 95% by weight, and the styrenic resin (B) accounts for from 0 to 95% by weight, preferably from 5 to 70% by weight, more preferably from 5 to 40% by weight. If the polycarbonate resin content for the component (A) is smaller than 5% by weight, the heat resistance and the mechanical strength of the moldings of the composition will be low; and if the styrenic resin content for the component (B) is smaller than 5% by weight, the moldability of the composition may be poor. Especially preferably, the styrenic resin content is smaller than 40% by weight, as the flame retardancy level of the resin composition increases from the class HB to the class V-2 in UL94. In this case, the styrenic resin (B) is preferably the above-mentioned acrylonitrile-styrene copolymer or rubber-modified styrenic resin, more preferably, the rubber-modified styrenic resin. The rubber component of the polycarbonate resin composition containing the rubber-modified styrenic resin is preferably at most 15% by weight, more preferably at most 10% by weight. The blend ratio of the resins may be suitably determined, depending on the molecular weight of the polycarbonate resin, the type, the molecular weight, the melt index and the rubber content of the styrenic resin, and the use, the size and the thickness of the resin moldings.

The phosphate content for the component (C) falls between 1 and 30 parts by weight, preferably between 2 and 25 parts by weight, more preferably between 3 and 20 parts by weight, relative to 100 parts by weight of the resin of (A) and (B). If the phosphate content is smaller than 1 part by weight, the intended flame retardancy is difficult to attain; but if larger than 30 parts by weight, the heat resistance and the impact strength of the resin moldings will lower. Therefore, the phosphate content is determined in consideration of the desired flame retardancy of the resin moldings, comprehensively depending on the type of the phosphate compound and on the content of any other additive of rubber-like elastomer and inorganic filler.

The flame-retardant polycarbonate resin composition of the invention basically comprises the components (A) to (C). If desired, however, an additional component (D), fluoro-olefin resin may be added to the flame-retardant polycarbonate resin composition, for preventing resin melts from dropping when the composition is fired. The fluoro-olefin resin (D) is generally a polymer or copolymer having a fluoro-ethylenic structure, for example, including difluoroethylene polymers, tetrafluoroethylene polymers, tetrafluoroethylene-hexafluoropropylene copolymers, and copolymers of tetrafluoroethylene with fluorine-free ethylenic monomers.

Preferred is polytetrafluoroethylene (PTFE) desirably having a mean molecular weight of at least 500,000, more desirably from 500,000 to 10,000,000. Any and every type of polytetrafluoroethylene known at present in the art is usable in the invention.

More preferred for use herein is polytetrafluoroethylene having the ability to form fibrils, as its property of preventing resin melts from dropping is better. The fibril-forming polytetrafluoroethylene (PTFE) is not specifically defined, but preferred is PTFE of Type 3 defined in the ASTM Standard. Specific examples of PTFE of Type 3 include Teflon 6-J (from Mitsui-DuPont Fluorochemical), Polyflon D-1, Polyflon F-103, Polyflon F201 (all from Daikin Industry), and CD-076 (from Asahi ICI Fluoropolymers).

Others except PTFE of Type 3 are also employable herein, including, for example, Argoflon F5 (from Montefluos), Polyflon MPA and Polyflon FA-100 (both from Daikin Industry). These polytetrafluoroethylenes (PTFES) may be used either singly or as combined. The fibril-forming polytetrafluoroethylenes (PTFES) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefin resin content of the resin composition falls between 0.02 and 5 parts by weight, preferably between 0.05 and 2 parts by weight, relative to 100 parts by weight of the resin of (A) and (B) in the composition. If the fluoro-olefin resin content is smaller than 0.02 parts by weight, the resin melt-dropping preventing ability of the composition will be not enough for the intended flame retardancy of the composition. However, even if the content is larger than 5 parts by weight, the effect of the fluoro-olefin resin added could not be augmented any more, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain a core/shell-type, grafted rubber-like elastomer (E) which further enhances the impact resistance of the moldings of the composition. The grafted rubber-like elastomer content of the composition falls between 0.2 and 30 parts by weight, preferably between 0.5 and 10 parts by weight, relative to 100 parts by weight of the resin of (A) and (B) in the composition. The grafted rubber-like elastomer content shall be suitably and comprehensively determined in consideration of the necessary properties including impact resistance, heat resistance and toughness of the intended moldings of the composition.

The core/shell-type, grafted rubber-like elastomer has a two-layered structure composed of a core and a shell, in which the core is of a flexible rubber material and the shell that covers the core is of a hard resin material. As a whole, the elastomer itself is powdery or granular. After blended with a polycarbonate resin in melt, the grafted rubber-like elastomer of that type mostly keeps its original powdery or granular condition. Since the grafted rubber-like elastomer keeps its original powdery or granular condition after having been blended with the resin melt, it is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (from Rohm & Haas), Metablen W529, Metablen S2001, Metablen C223, Metablen B621 (all from Mitsubishi Rayon).

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and alkyl methacrylates, the alkyl group preferably has from 2 to 10 carbon atoms. Concretely, the acrylates and methacrylates include, for example, ethyl acrylate, butyl acrylate, 2-ethylhexyl acrylate, and n-octyl methacrylate. One example of the rubber-like elastomers that are obtained from monomers of essentially those alkyl (meth)acrylates is a polymer to be prepared through reaction of at least 70% by weight of the alkyl (meth)acrylates with at most 30% by weight of other copolymerizable vinylic monomers such as methyl methacrylate, acrylonitrile, vinyl acetate, and styrene. To prepare the polymer, a polyfunctional monomer serving as a crosslinking agent, such as divinylbenzene, ethylene dimethacrylate, triallyl cyanurate, or triallyl isocyanurate, may be added to the polymerization system.

The vinylic monomers to be polymerized in the presence of a rubber-like polymer include, for example, aromatic vinyl compounds such as styrene, a-methylstyrene; acrylates such as methyl acrylate, ethyl acrylate; and methacrylates such as methyl methacrylate, ethyl methacrylate. One or more these monomers may be (co)polymerized, as combined, or may be copolymerized with any other vinylic monomers such as vinyl cyanide compounds (e.g., acrylonitrile, methacrylonitrile), and vinyl esters (e.g., vinyl acetate, vinyl propionate). The (co)polymerization may be effected in any known method of, for example, bulk polymerization, suspension polymerization, or emulsion polymerization. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl(meth)acrylate rubber component as so entangled that they are not separated from each other, and has a mean particle size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The flame-retardant polycarbonate resin composition of the invention is characterized in that, when the composition, generally ground pellets of the composition are subjected to Soxhlet extraction with a solvent of acetone, the phenol content of the extract is at most 300 ppm, preferably at most 200 ppm of the total amount of the composition. If the phenol content of the extract is larger than 300 ppm, it is unfavorable since the in-line heat stability, the thermal aging resistance, the wet heat resistance and the recyclability of the resin moldings are poor, or that is, the physical properties of the resin moldings, especially the thermal stability thereof are worsened, and the resin moldings often yellow.

The phenols include all derived from the polycarbonate resin, the phosphate compound and other additives constituting the resin composition. Concretely, they will be derived from the starting polycarbonate resin, phosphate compound and styrenic resin, even from the impurities in these starting materials, and also from additives to the composition and from decomposates produced while the resin composition is melted and kneaded under heat, and will be in the final composition, generally in the pellets of the composition, and all such phenols are meant herein.

As so mentioned hereinabove, it is desirable that, in the flame-retardant polycarbonate resin composition of the invention, the terminal hydroxyl ratio to the terminals of the polycarbonate resin is at least 5 mol %, more preferably falling between 0.5 and 20 mol %. It is also desirable that the halogen content, especially the chlorine content of the flame-retardant polycarbonate resin composition of the invention is at most 50 ppm, more preferably at most 30 ppm.

Methods of analyzing the flame-retardant polycarbonate resin composition for the components are mentioned below.
(1) Determination of Phenol Content:

Pellets of a sample of the flame-retardant polycarbonate resin composition to be analyzed are ground, and passed through a 100-mesh metal sieve. 15 g of the powder having passed through the sieve is metered, and put into a cylindrical paper filter No. 84 (28×100 mm). This is extracted with 300 ml of acetone, while refluxed for 8 hours at a rate of once (20 ml) for 3 to 4 minutes. Acetone is removed from the resulting extract, and the low-molecular weight residue is weighed. This is dissolved in DMF (dimethylfuran), to which is added N,O-bis(trimethylsilyl)acetamide. Then, this is subjected to temperature-programmed GC analysis through which the phenols therein are quantitatively identified. Based on the data of the low-molecular weight component thus quantified, the phenol content of the composition is calculated.
(2) Determination of Terminal Hydroxyl Ratio to all Terminals of Polycarbonate Resin:

A sample of the polycarbonate resin is-analyzed through NMR.
(3) Determination of Halogen Content of Resin Composition:

10 g of dry pellets of a sample of the flame-retardant polycarbonate resin composition to be analyzed are dissolved in 90 g of methylene chloride, to which is added 50 ml of acetone. This is subjected to potentiometric titration in an automatic titrimeter, for which the titration reagent is a 0.005 M silver nitrate/acetone solution.

The flame-retardant polycarbonate resin composition of the invention may contain, in addition to the indispensable components (A) and (C), at least one optional component selected from (B), (D) and (E), and any other additives that are generally added to ordinary thermoplastic resins, if desired. The optional components and additives are for further improving the moldability of the composition and for further improving the impact resistance, the toughness, the outward appearances, the weather resistance and the stiffness of the moldings of the composition. They include, for example, inorganic fillers such as talc, calcium carbonate, glass fibers, carbon fibers; other thermoplastic resins such as polyester resins; and also phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), microbicides, compatibilizers, and colorants (dyes, pigments). For their amount, the optional components and additives that may be in the flame-retardant polycarbonate resin composition of the invention are not specifically defined, provided that they do not interfere with the properties of the composition.

A method for producing the flame-retardant polycarbonate resin composition of the invention is described. The flame-retardant polycarbonate resin composition of the invention may be produced by mixing and kneading the components (A) and (C) in a predetermined ratio as above, optionally along with any of the optional components (B), (D) and (E) and additives as above in any desired ratio. Formulating and mixing the constituent components into the intended resin composition may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a cokneader. The temperature at which the components are mixed and kneaded generally falls between 240 and 300° C.

Other components than polycarbonate resin and styrenic resin may be previously mixed with polycarbonate resin or styrenic resin or with any other thermoplastic resin to prepare a master batch, and it may be added to the other constituent components. It is necessary that the content of the impurities and the residual solvent in the starting materials for the flame-retardant polycarbonate resin composition of the invention is as small as possible. Regarding the mode of mixing the starting material to prepare the resin composition, it is desirable that the starting materials are melted and kneaded in an extruder having a large L/D, and the resulting melt is taken out from the bed by vacuum suction to thereby remove the residual solvent from the melt; or they are melted and kneaded in a two-stage extruder so that the volatile component having been released from the resulting melt mixture is fully sucked and removed from the melt mixture. As the case may be, a small amount of alcohol or water may be added to the mixing system, and the impurities are removed from the resulting melt mixture along with the vapor of the additive, alcohol or water accompanied by them.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, employable is a gas-assisted injection molding method so as to prevent shrinkage cavity around the moldings and to reduce the weight of the moldings.

Injection moldings (including those molded in a mode of injection compression molding) of the flame-retardant polycarbonate resin composition of the invention are usable for various housings and parts for electric and electronic appliances, for example, those for OA appliances and information appliances such as duplicators, facsimiles, televisions, radios, tape recorders, video decks, personal computers, printers, telephones and information terminals; and those for other electric and electronic appliances for household use such as microwave ovens and refrigerators. The moldings have still other applications, and are usable, for example, as automobile parts.

The invention is described more concretely with reference to the following Examples and Comparative Examples, which, however, are not intended to restrict the scope of the invention.

[Examples I-1 to I-9, and Comparative Examples I-1 to I-3]

The components shown in Table I-1 and Table I-2 were blended in the ratio indicated therein (the components (A) and (B) are in terms of % by weight, and the other components are in terms of parts by weight relative to 100 parts by weight of the total of (A) and (B)), fed into a vented double-screw extruder (TEM35 from Toshiba Kikai), melted and kneaded therein at 280° C. (for PC alone) or 260° C. (for PC combined with PS) with the degree of pressure reduction through the vent being at most 600 mmHg, and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. Only in Comparative Example 3, the vent was open to form the pellets. The resulting pellets were dried at 80° C. for 12 hours, and then molded into test pieces and articles in a mode of injection molding at 280° C. (for PC only) or 260° C. (for PC combined with PS). The test pieces were tested for their properties in various test methods, and their data obtained are given in Table I-1 and Table I-2. In these Tables, Example I-1 is referred to as Example 1, and the same shall apply to the other Examples and Comparative Examples.

The molding materials used herein and the methods for testing the samples produced herein are mentioned below.

(A) Polycarbonate Resin:

PC-1: Bisphenol A polycarbonate resin having an MI of 20 g/10 min (at 300° C., under a load of 1.2 kg), a viscosity-average molecular weight of 19,000, an acetone-extracted phenol content of 80 ppm, a terminal hydroxyl ratio of 5 mol %, and a chlorine content of 80 ppm.

PC-2: Bisphenol A polycarbonate resin having an MI of 20 g/10 min (at 300° C., under a load of 1.2 kg), a viscosity-average molecular weight of 19,000, an acetone-extracted phenol content of 60 ppm, a terminal hydroxyl ratio of 0.3 mol %, and a chlorine content of 80 ppm.

PC-3: Bisphenol A polycarbonate resin having an MI of 20 g/10 min (at 300° C., under a load of 1.2 kg), a viscosity-average molecular weight of 19,000, an acetone-extracted phenol content of 340 ppm, a terminal hydroxyl ratio of 5 mol %, and a chlorine content of 60 ppm.

(B) Styrenic Resin:

HIPS: High-impact polystyrene resin. This is a polystyrene-grafted polybutadiene having a rubber content of 10% by weight and an MI of 8 g/10 min (at 200° C., under a load of 5 kg).

ABS: Acrylonitrile-butadiene-styrene copolymer (ABS). This is DP-611 (from Technopolymer), having an MI of 2 g/10 min (at 200° C., under a load of 5 kg).

(C) Organic Phosphorus-containing Flame Retardant:

P-1: Triphenyl phosphate. This is TPP (from Daihachi Chemical).

P-2: Resorcinol bis(diphenyl phosphate). This is a phosphate, PFR (from Asahi Denka Kogyo).

P-3: 1,3-Phenylene-tetrakis(2,6-dimethylphenyl phosphate). This is PX-200 (from Daihachi Chemical).

(D) Fluoro-olefin Resin:

PTFE: Polytetrafluoroethylene. This is F201L (from Daikin Chemical), having a molecular weight of from 4,000,000 to 5,000,000.

(E) Core/shell-type, grafted rubber-like elastomer:

Composite rubber-type graft copolymer: Metablen S2001 (from Mitsubishi Rayon), having a polydimethylsiloxane content of at least 50% by weight.

Test Methods:

(1) IZOD (Izod Impact Strength):

Measured according to ASTM D256. The temperature is 23° C., and the thickness of samples is ⅛ inches. The data are in terms of $kJ/m^2$.

(2) Flame Retardancy:

Tested according to the UL94 combustion test. Samples tested have a thickness of 1.5 mm.

(3) Weld Strength:

1. Using a mold into which a molding material is led through two gates, tensile strength test pieces are molded, and their tensile strength is measured.
2. Weld strength retentiveness (%)=(tensile strength of welded part/tensile strength of non-welded part)×100.

(4) In-line Heat Stability:

A sample of the resin composition to be tested is kept staying in an injection molding machine at 260° C. for 60 minutes, and then molded into test pieces, and the color difference (ΔE) is measured. According to JIS H7103 (test method for yellowing), the color (L, a, b) of the test pieces before and after the heat treatment is measured with a calorimeter. The color change indicates the color difference (ΔE).

(5) Thermal Aging Resistance:

Moldings are heated at 80° C. for 500 hours, and the IZOD impact strength and ΔE of the moldings after the heat treatment are measured.

(6) Wet Heat Resistance:

Moldings are subjected to an exposure test at a temperature of 70° C. and a humidity of 90% for 500 hours. After the test, the IZOD impact strength and the color difference (ΔE) of the moldings are measured.

(7) Recyclability:

Housings for portable personal computers (of A4 size) are molded. These are ground, and 100% recycled into test pieces molded in the same manner as previously. The IZOD impact strength and the color difference (ΔE) of the recycled test pieces are measured.

TABLE I-1

|  | Ex. 1 | Co. Ex. 1 | Ex. 2 | Ex. 3 | Co. Ex. 2 | Ex. 4 |
|---|---|---|---|---|---|---|
| Constituent Ingredients | | | | | | |
| (A) | | | | | | |
| PC-1: terminal OH (5 mol %) | 100 | | 50 | | | 70 |
| PC-2: terminal OH (0.3 mol %) | | | | 50 | | |
| PC-3: terminal OH (5 mol %) | | 100 | | | 50 | |
| (B) | | | | | | |
| HIPS | | | 50 | 50 | 50 | |
| ABS | | | | | | 30 |
| (C) | | | | | | |
| P-1: TPP | | | | | | 10 |
| P-2: PFR | 3 | 3 | 10 | 10 | 10 | |
| P-3: PX-200 | | | | | | |
| (D) | | | | | | |
| Rubber-like elastomer | | | | | | |
| (E) | | | | | | |
| PTFE | | | | | | |
| Phenol content (ppm) | 90 | 350 | 120 | 110 | 320 | 80 |
| Chlorine content (ppm) | 30 | 30 | 20 | 15 | 15 | 20 |
| Evaluation | | | | | | |
| (1) IZOD impact strength (kJ/m$^2$) | 70 | 70 | 15 | 12 | 12 | 50 |
| (2) UL-94 (test piece thickness: 1.5 mm) | V-2 | V-2 | HB | HB | HB | V-2 |
| (3) Weld tensile strength (MPa) | 65 | 60 | 35 | 25 | 30 | 40 |
| Weld strength retentiveness (%) | 98 | 95 | 60 | 40 | 55 | 70 |
| (4) In-line heat stability: color change ($\Delta$E) | 1 | 13 | 2 | 2 | 17 | 2 |
| (5) Thermal aging resistance: IZOD impact strength (kJ/m$^2$) | 70 | 60 | 12 | 10 | 8 | 45 |
| Color change ($\Delta$E) | 2 | 15 | 2 | 2 | 22 | 1 |
| (6) Wet heat resistance: IZOD impact strength (kJ/m$^2$) | 60 | 50 | 10 | 10 | 8 | 40 |
| Color change ($\Delta$E) | 3 | 27 | 5 | 4 | 30 | 2 |
| (7) Recyclability: IZOD impact strength (kJ/m$^2$) | 70 | 65 | 12 | 8 | 10 | 50 |
| Color change ($\Delta$E) | 1 | 8 | 2 | 2 | 10 | 2 |

TABLE I-2

|  | Ex. 5 | Co. Ex. 3 | Ex. 6 | Ex. 7 | Ex. 8 | Ex. 9 |
|---|---|---|---|---|---|---|
| Constituent Ingredients | | | | | | |
| (A) | | | | | | |
| PC-1: terminal OH (5 mol %) | 85 | 85 | 70 | 70 | 30 | |
| PC-2: terminal OH (0.3 mol %) | | | | | | 30 |
| PC-3: terminal OH (5 mol %) | | | | | | |
| (B) | | | | | | |
| HIPS | 15 | 15 | 30 | | | |
| ABS | | | | 30 | 70 | 70 |
| (C) | | | | 5 | 10 | 10 |
| P-1: TPP | 10 | 10 | | 5 | | |
| P-2: PFR | | | 10 | | | |
| P-3: PX-200 | | | | | | |
| (D) | | | | | | |
| Rubber-like elastomer | 3 | 3 | | | | |
| (E) | | | | | | |
| PTFE | 0.5 | 0.5 | | 0.5 | | |
| Phenol content (ppm) | 130 | 330 | 70 | 80 | 80 | 70 |
| Chlorine content (ppm) | 25 | 50 | 20 | 20 | 10 | 10 |
| Evaluation | | | | | | |
| (1) IZOD impact strength (kJ/m$^2$) | 70 | 65 | 50 | 60 | 40 | 15 |
| (2) UL-94 (test piece thickness: 1.5 mm) | V-0 | V-0 | V-2 | V-0 | HB | HB |

TABLE I-2-continued

|  | Ex. 5 | Co. Ex. 3 | Ex. 6 | Ex. 7 | Ex. 8 | Ex. 9 |
|---|---|---|---|---|---|---|
| (3) Weld tensile strength (MPa) | 45 | 45 | 35 | 40 | 30 | 20 |
| Weld strength retentiveness (%) | 80 | 80 | 65 | 80 | 60 | 50 |
| (4) In-line heat stability: color change (ΔE) | 3 | 14 | 2 | 3 | 3 | 3 |
| (5) Thermal aging resistance: IZOD impact strength (kJ/m²) | 65 | 50 | 45 | 60 | 40 | 15 |
| Color change (ΔE) | 3 | 17 | 2 | 3 | 3 | 3 |
| (6) Wet heat resistance: IZOD impact strength (kJ/m²) | 60 | 45 | 40 | 50 | 40 | 10 |
| Color change (ΔE) | 5 | 26 | 1 | 2 | 2 | 2 |
| (7) Recyclability: IZOD impact strength (kJ/m²) | 70 | 55 | 50 | 60 | 35 | 15 |
| Color change (ΔE) | 2 | 9 | 3 | 3 | 2 | 2 |

From the results shown in Tables I-1 and I-2 in which the data of the impact strength and the color of the moldings of Examples are compared with those of Comparative Examples, it is obvious that the moldings of the flame-retardant polycarbonate resin composition of the invention have good in-line heat stability, thermal aging resistance, wet heat resistance and recyclability. The resin composition containing a styrenic resin is also molded into good moldings.

[II] Second Aspect of the Invention:

The constituent components (A) to (C) of the flame-retardant polycarbonate resin composition of the second aspect of the invention (this will be simply referred to as "the invention" in this section) are described.

(A) Polycarbonate Resin (PC):

The polycarbonate resin (PC) serving as the component (A) in the flame-retardant polycarbonate resin composition of the invention is not specifically defined, and may be any and every one known in the art. Concretely referred to herein are those described in the section of the first aspect of the invention. In this, however, the polycarbonate resin is not specifically defined in point of the amount therein of the low-molecular weight component extracted in Soxhlet extraction with a solvent of acetone.

(B) Rubber-modified Polystyrene Resin:

The rubber-modified polystyrene resin for the component (B) of the flame-retardant polycarbonate resin composition of the invention is obtained by polymerizing a monovinylic aromatic monomer such as styrene, α-methylstyrene, p-methylstyrene, m-methylstyrene or 2,4-dimethylstyrene, either alone or as combined in the presence of a rubber-like polymer. In the rubber-modified polystyrene resin, rubber-like polymer particles are dispersed in the matrix of the aromatic vinyl polymer. For the resin, the monomer or monomer mixture may be polymerized in any mode of bulk polymerization, bulk suspension polymerization, solution polymerization or emulsion polymerization.

Specific examples of the rubber-like polymer are polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

The flame-retardant polycarbonate resin composition of the second aspect of the invention is characterized in that the rubber-modified polystyrene resin therein has the following characteristics. Specifically, the rubber-modified polystyrene resin has:

(a) an area-average rubber particle size of from 0.1 to 2.5 μm,
(b) a swelling index of from 10 to 20, and
(c) a gel content of from 15 to 25% by weight.

First, (a) the rubber particles in the rubber-modified polystyrene resin have an area-average particle size of from 0.1 to 2.5 μm. If the area-average rubber particle size of the rubber-modified polystyrene resin in the resin composition is smaller than 0.1 μm, the impact resistance of the resin moldings is low; but if larger than 2.5 μm, the toughness of the moldings is low, the appearance of the welded part of the moldings is not good, and the weld strength of the moldings is low. In particular, the moldings could not be well colored in dark color, and will be unevenly colored, and the commercial value of the moldings will be lowered. Accordingly, the area-average rubber particle size of the rubber-modified polystyrene resin in the resin composition preferably falls between 0.3 and 2 μm.

The area-average particle size of the rubber particles in the rubber-modified polystyrene resin is measured as follows: A sample of the resin is stained with osmic acid, and formed into an ultra-thin piece. Its photographic picture is taken through a transmission electronic microscope. On the image, the major diameter (D) of each of 200 rubber-like polymer particles is measured, and the area-average rubber particle size (Ds) is calculated according to the following formula:

$$Ds = (\Sigma D^3)/(\Sigma D^2)$$

Secondly, (b) the rubber-modified polystyrene resin has a swelling index of from 10 to 20, preferably from 12 to 18. If the swelling index oversteps the defined range, it is unfavorable since the impact strength of the resin moldings is low. In particular, if its swelling index is smaller than 10, the rubber-modified polystyrene resin is not well miscible with polycarbonate resin, thereby causing surface layer peeling of the resin moldings, and the outward appearance of the resin moldings will be poor.

Thirdly, the gel content of the rubber-modified polystyrene resin falls between 15 and 25% by weight, preferably between 17 and 23% by weight. If the gel content of the rubber-modified polystyrene resin is smaller than 15% by weight, the impact resistance of the resin moldings is low; but if larger than 25% by weight, the surface gloss of the resin moldings is low and the appearance thereof will be not good. In addition, if the gel content is smaller than 15% by weight, the rubber-modified polystyrene resin is not well miscible with polycarbonate resin.

The swelling index and the gel content of the rubber-modified polystyrene resin can be calculated as follows: A sample of the resin, Wc (3 g) is dissolved in 150 ml of toluene, and centrifuged at 15,000 rpm for 60 minutes. The supernatant is removed through decantation. 150 ml of toluene is again added to the residue. This is stirred, and again centrifuged, and the supernatant is removed through decantation. The weight of the swollen, insoluble component Ws (g) is measured. Then, this is dried in vacuum at 60° C. for 24 hours, and its dry weight Wg (g) is measured. The swelling index and the gel content of the resin sample are represented as follows:

Swelling index=Ws/Wg;

Gel content (% by weight)=(Wg/Wc)×100.

The production method for the rubber-modified polystyrene resin for use in the invention is not specifically defined. For example, the resin can be produced as follows. An aromatic vinyl monomer is polymerized in the presence of from 3 to 12% by weight of a rubber-like polymer, and the resulting polymer is degassed under a specific condition. For the monomer polymerization, employable is any known mode of bulk polymerization or bulk suspension polymerization, but preferred is bulk polymerization. For controlling the area-average rubber particle size of the rubber-modified polystyrene resin to fall within the defined range, employable is a known method of varying the stirring condition in monomer polymerization. Regarding the molecular weight of the rubber-modified polystyrene resin, the degree of polymerization of the resin is generally so controlled that the melt index (MI) of the resin measured at a temperature of 200° C. under a load of 5 kg according to JIS K7210 falls between 1 and 20 g/10 min.

After having been thus polymerized, the polymer is degassed generally at a temperature falling between 190 and 250° C. for a residence time of from 0.5 to 3 hours to thereby control the swelling index and the gel content of the polymer to fall within the defined range. Through the process, the rubber-modified polystyrene resin for use in the invention can be obtained.

(C) Phosphate Compound:

The phosphate compound is preferably a non-halogen phosphate compound. For this, concretely referred to are those described in the section of the first aspect of the invention.

The formulation of the components (A) to (C) in the invention is described. In the invention, the rubber-modified polystyrene resin of the component (B) has no direct relation to the flame retardancy of the resin composition. It is for improving the melt fluidity of the polycarbonate resin in the resin composition and for enhancing the impact resistance of the resin moldings. The blend ratio of the polycarbonate resin (A) to the rubber-modified polystyrene resin (B) is such that the polycarbonate resin (A) accounts for from 60 to 99% by weight, preferably from 70 to 95% by weight, and the rubber-modified polystyrene resin (B) accounts for from 1 to 40% by weight, preferably from 5 to 30% by weight. If the polycarbonate resin content for the component (A) is smaller than 60% by weight, the heat resistance and the mechanical strength of the moldings of the composition will be low; and if the rubber-modified polystyrene resin content for the component (B) is smaller than 1% by weight, the moldability of the composition may be poor. The blend ratio of the resins may be suitably determined, depending on the molecular weight of the polycarbonate resin, the type, the molecular weight, the melt index and the rubber content of the rubber-modified polystyrene resin, and the use, the size and the thickness of the resin moldings.

The phosphate content for the component (C) falls between 1 and 30 parts by weight, preferably between 2 and 25 parts by weight, more preferably between 3 and 20 parts by weight, relative to 100 parts by weight of the resin of (A) and (B). If the phosphate content is smaller than 1 part by weight, the intended flame retardancy is difficult to attain; but if larger than 30 parts by weight, the heat resistance and the impact strength of the resin moldings will lower. Therefore, the phosphate content is determined in consideration of the desired flame retardancy of the resin moldings, comprehensively depending on the type of the phosphate compound and on the content of any other additive of rubber-like elastomer and inorganic filler.

The flame-retardant polycarbonate resin composition of the invention basically comprises the components (A) to (C). If desired, however, an additional component (D), fluoro-olefin resin may be added to the flame-retardant polycarbonate resin composition, for preventing resin melts from dropping when the composition is fired. The fluoro-olefin resin (D) is generally a polymer or copolymer having a fluoro-ethylenic structure. For this, referred to are those described in the section of the first aspect of the invention.

The fluoro-olefin resin content of the resin composition falls between 0.02 and 5 parts by weight, preferably between 0.05 and 2 parts by weight, relative to 100 parts by weight of the resin of (A) and (B) in the composition. If the fluoro-olefin resin content is smaller than 0.02 parts by weight, the resin melt-dropping preventing ability of the composition will be not enough for the intended flame retardancy of the composition. However, even if the content is larger than 5 parts by weight, the effect of the fluoro-olefin resin added could not be augmented any more, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain a core/shell-type, grafted rubber-like elastomer (E) which further enhances the impact resistance of the moldings of the composition. The grafted rubber-like elastomer content of the composition falls between 0.2 and 30 parts by weight, preferably between 0.5 and 10 parts by weight, relative to 100 parts by weight of the resin of (A) and (B) in the composition. The grafted rubber-like elastomer content shall be suitably and comprehensively determined in consideration of the necessary properties including impact resistance, heat resistance and toughness of the intended moldings of the composition.

For the core/shell-type, grafted rubber-like elastomer, referred to are those described in the section of the first aspect of the invention.

The flame-retardant polycarbonate resin composition of the invention may contain, in addition to the indispensable components (A) to (C), at least one optional component selected from (D) and (E), and any other additives that are generally added to ordinary thermoplastic resins, if desired. The optional components and additives are for further improving the moldability of the composition and for further improving the impact resistance, the toughness, the outward appearances, the weather resistance and the solvent resistance of the moldings of the composition. For these, concretely referred to are those described in the section of the first aspect of the invention.

For the method of producing the flame-retardant polycarbonate resin composition of the invention, referred to are those described in the section of the first aspect of the invention. The resin composition can be produced by formulating and kneading the above-mentioned components and other optional components and additives in a suitable ratio.

For the method of molding the flame-retardant polycarbonate resin composition of the invention, also referred to are those described in the section of the first aspect of the invention.

Injection moldings (including those molded in a mode of injection compression molding) of the flame-retardant polycarbonate resin composition of the invention are usable for various housings and parts for electric and electronic appliances such as duplicators, facsimiles, televisions, radios, tape recorders, video decks, personal computers, printers, telephones, information terminals, refrigerators and microwave ovens. The moldings have still other applications, and are usable, for example, as automobile parts.

The invention is described more concretely with reference to the following Examples and Comparative Examples, which, however, are not intended to restrict the scope of the invention.

[Examples II-1 to II-4, and Comparative Examples II-1 to II-4]

The components shown in Table II-1 were blended in the ratio indicated therein (the components (A) and (B) are in terms of % by weight, and the other components are in terms of parts by weight relative to 100 parts by weight of the total of (A) and (B)), fed into a vented double-screw extruder (TEM35 from Toshiba Kikai), melted and kneaded therein at 260° C. with the degree of pressure reduction through the vent being 600 mmHg, and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 80° C. for 12 hours, and then molded into test pieces and articles in a mode of injection molding at 240° C. The test pieces and the articles were tested for their properties in various test methods, and their data obtained are given in Table II-1.

In the Table, Example II-1 is referred to as Example 1, and the same shall apply to the other Examples and Comparative Examples.

The molding materials used herein and the methods for testing the samples produced herein are mentioned below.

(A) Polycarbonate Resin:
  PC-1: Bisphenol A polycarbonate resin having an MI of 20 g/10 min (at 300° C., under a load of 1.2 kg), a viscosity-average molecular weight of 19,000, and a terminal hydroxyl ratio of 5 mol %.

(B) Rubber-modified polystyrene resin:
  HIPS-1: This is prepared in the manner mentioned below, according to the method described hereinabove.
    Used is a styrene polymerization system comprising two perfect mixing reactors, two tower reactors and two flash drums connected in series. Styrene containing 9% by weight of a rubber-like polymer, polybutadiene (Ube Kosan's BR-15HB) is introduced into the styrene polymerization system, and polymerized up to a conversion of 90%. Next, the polymer is degassed in the flash drums under a reduced pressure of 10 mmHg, in which the rubber-modified polystyrene resin is kept at 230° C. and the processing time is 1.5 hours. Next, the thus-processed resin is extruded to be strands, and pelletized.
    In the thus-obtained, rubber-modified polystyrene resin, polybutadiene is graft-polymerized with styrene. The resin has a rubber content of 9.9% by weight, an MI of 8 g/10 min (at 200° C. under a load of 5 kg), and has (a) an area-average rubber particle size of 1 μm, (b) a swelling index of 15, and (c) a gel content of 18%.
  HIPS-2: This is a commercially-available HI-PS of polybutadiene graft-polymerized with polystyrene, having a rubber content of 9% by weight, an MI of 8 g/10-min (at 200° C. under a load of 5 kg), and having (a) an area-average rubber particle size of 2 μm, (b) a swelling index of 15, and (c) a gel content of 18%.
  HIPS-3: This is a commercially-available HI-PS of polybutadiene graft-polymerized with polystyrene, having a rubber content of 6% by weight, an MI of 8 g/10 min (at 200° C. under a load of 5 kg), and having (a) an area-average rubber particle size of 1 μm, (b) a swelling index of 16, and (c) a gel content of 14%.
  HIPS-4: This is a commercially-available HI-PS of polybutadiene graft-polymerized with polystyrene, having a rubber content of 9% by weight, an MI of 8 g/10 min (at 200° C. under a load of 5 kg), and having (a) an area-average rubber particle size of 2 μm, (b) a swelling index of 8, and (c) a gel content of 24%.

(C) Phosphate Compound:
  P-1: Triphenyl phosphate. This is TPP (from Daihachi Chemical).
  P-2: Resorcinol bis(diphenyl phosphate). This is a phosphate, PFR (from Asahi Denka Kogyo).
  P-3: 1,3-Phenylene-tetrakis(2,6-dimethylphenyl phosphate). This is PX-200 (from Daihachi Chemical).

(D) Fluoro-olefin Resin:
  PTFE: Polytetrafluoroethylene. This is F201L (from Daikin Chemical), having a molecular weight of from 4,000,000 to 5,000,000.

(E) Core/shell-type, Grafted Rubber-like Elastomer:
  Composite rubber-type graft copolymer: Metablen S2001 (from Mitsubishi Rayon), having a polydimethylsiloxane content of at least 50% by weight.

(F) Pigment for Coloration:
  Light gray color for polycarbonate resin.

Test Methods:

(1) L of moldings:
  According to JIS K7105, L of moldings is obtained, for which is used a test machine from Nippon Denshoku.

(2) Gloss of Moldings:
  According to JIS K7105, the surface gloss of moldings is obtained, for which is used a test machine from Nippon Denshoku. The incident angle of light to the moldings is 60 degrees.

(3) Surface layer Peeling:
  Moldings are cut, and the cross section of each sample is macroscopically checked. Samples with no peeling are good (O); and those with some surface layer peeling are not good (x).

(4) Appearance of welded part of moldings:
  Using a mold into which a molding material is led through two gates, housings for portable personal computers (of A4 size) are molded. The temperature of the molding material is 260° C., and the mold temperature is 60° C. The appearance of the welded part of the housings is macroscopically checked. Housings of good appearance are good (O); and those of poor appearance are not good (x).

(5) Weld Characteristics:
Weld Tensile Strength:
Using a mold into which a molding material is led through two gates, tensile strength test pieces-are molded, and their tensile strength is measured.

Weld tensile strength retentiveness (%)=(tensile strength of welded part/tensile strength of non-welded part) ×100.

(6) IZOD (Izod Impact Strength):
Measured according to ASTM D256. The temperature is 23° C., and the thickness of samples is 1/8 inches. The data are in terms of $kJ/m^2$.

(7) Flame Retardancy:
Tested according to the UL94 combustion test. Samples tested have a thickness of 1.5 mm.

of the invention is not specifically defined, and may be any and every one known in the art. Concretely referred to herein are those described in the section of the first aspect of the invention. In this, however, the polycarbonate resin is not specifically defined in point of the amount therein of the low-molecular weight component extracted in Soxhlet extraction with a solvent of acetone.

(B) Styrenic Resin:

For the styrenic resin serving as the component (B) in the flame-retardant polycarbonate resin composition of the invention, referred to are those described in the section of the first aspect of the invention. In the invention, however,

TABLE II-1

|  | Ex. 1 | Co. Ex. 1 | Ex. 2 | Co. Ex. 2 | Ex. 3 | Co. Ex. 3 | Ex. 4 | Co. Ex. 4 |
|---|---|---|---|---|---|---|---|---|
| Constituent Ingredients | | | | | | | | |
| (A) | | | | | | | | |
| PC-1 | 83 | 83 | 83 | 83 | 75 | 75 | 80 | 80 |
| (B) | | | | | | | | |
| HIPS-1 | 17 | | 17 | | 25 | | 20 | |
| HIPS-2 | | 17 | | 17 | | | | |
| HIPS-3 | | | | | | | | 20 |
| HIPS-4 | | | | | | 25 | | |
| (C) | | | | | | | | |
| P-1: TPP | 11 | 11 | | | 10 | 10 | | |
| P-2: PFR | | | | | | | 8 | 8 |
| P-3: PX-200 | | | 11 | 11 | | | | |
| (D) | | | | | | | | |
| PTFE | 0.3 | 0.3 | 0.3 | 0.3 | 0.3 | 0.3 | 0.3 | 0.3 |
| (E) | | | | | | | | |
| Rubber-like elastomer | | | 5 | 5 | | | | |
| (F) | | | | | | | | |
| Pigment for coloration | 0.8 | 0.8 | 0.8 | 0.8 | 0.8 | 0.8 | 0.8 | 0.8 |
| Evaluation | | | | | | | | |
| (1) L of moldings | 60 | 60 | 60 | 60 | 60 | 60 | 60 | 60 |
| (2) Gloss of moldings | 90 | 55 | 90 | 60 | 85 | 60 | 90 | 85 |
| (3) Surface layer peeling | ○ | x | ○ | x | ○ | x | ○ | x |
| (4) Appearance of welded part | ○ | x | ○ | x | ○ | x | ○ | ○ |
| (5) Weld tensile strength (MPa) | 50 | 30 | 50 | 30 | 45 | 35 | 50 | 45 |
| Weld tensile strength retentiveness (%) | 85 | 50 | 80 | 45 | 70 | 55 | 85 | 80 |
| (6) IZOD impact strength ($kJ/m^2$) | 40 | 20 | 65 | 50 | 35 | 25 | 40 | 35 |
| (7) UL-94 (sample thickness: 1.5 mm) | V-0 | V-0 | V-0 | V-0 | V-0 | V-0 | V-0 | V-0 |

From the results shown in Table II-1, it is obvious that the moldings of the flame-retardant polycarbonate resin composition of the invention, in which the rubber-modified polystyrene resin satisfies all the requirements defined herein have good surface gloss, good surface layer peeling resistance, and good weld characteristics. In particular, the surface properties of the moldings colored in dark color having a low value L are good. In addition, the moldings all have good impact resistance, good flame retardancy and good moldability.

[III] Third Aspect of the Invention:

The constituent components (A) to (D) of the flame-retardant polycarbonate resin composition of the third aspect of the invention (this will be simply referred to as "the invention" in this section) are described.

(A) Polycarbonate Resin (PC):

The polycarbonate resin (PC) serving as the component (A) in the flame-retardant polycarbonate resin composition preferred are styrenic resins having a melt index, measured at 200° C. under a load of 5 kg according to JIS K7210, of generally between 1 and 40 g/10 min, preferably between 2 and 20 g/10 min.

(C) Phosphate Compound:

The phosphate compound is preferably a non-halogen phosphate compound. For this, referred to are those described in the section of the first aspect of the invention.

Of the phosphate compounds described hereinabove, those of the following formula (2), or that is, condensed phosphate compounds having a resorcinol or hydroquinone structure and a phenylene-ether structure are preferred herein.

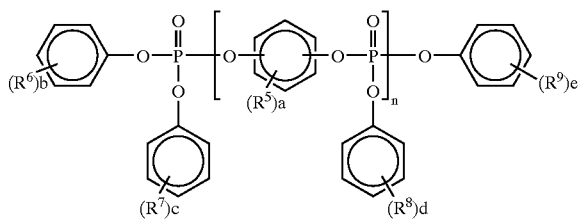

(2)

wherein $R^5$, $R^6$, $R^7$, $R^8$ and $R^9$ each independently represent a hydrocarbon residue having from 1 to 10 carbon atoms; a, b, c, d and e each fall between 0 and 3; and n is an integer falling between 1 and 3. Of formula (2), preferred are those where a, b, c, d and e are not 0 at the same time. Especially preferred are phosphate compounds having an alkyl group at the 2- and 6-positions.

Concretely, they include 1,3-phenylene-tetrakis(2,6-dimethylphenyl) phosphate , and 1,4-phenylene-tetrakis (2,6-dimethylphenyl) phosphate. These specific phosphate compounds are, when compared with those corresponding thereto but having a diphenyl group or a bisphenol A group in place of the phenylene group, are more readily decomposed when fired. In addition, as their phosphorus content is high, the flame-retarding capability of the phosphate compounds is high. Further, as they have an alkyl group at the 2- and 6-position, their hydrolysis resistance is high.

However, the phosphate compound to be in the flame-retardant polycarbonate resin composition is not limited to such expensive, condensed phosphate compounds having a substituent such as an alkyl group at the 2- and 6-positions. Even when unsubstituted resorcinol bis (diphenyl phosphate) is therein, the resin composition has good heat resistance, good moisture resistance and good recyclability.

(D) Tabular Inorganic Filler:

The tabular inorganic filler to be in the resin composition is not specifically defined, and may be any of talc, clay, mica (phlogopite, muscovite), and glass flakes. The tabular inorganic filler may have a mean particle size of generally from 0.1 to 10 μm, but preferably from 0.2 to 2 μm, more preferably from 0.2 to 1 μm. In the invention, the tabular inorganic filler is not for essentially improving the toughness of the resin moldings. Therefore, even when its mean particle size is not larger than 2 μm, the tabular inorganic filler is well effective for attaining the object of the invention. If its mean particle size is too large, the filler could not well disperse in the resin composition, and could not often exhibit its effect satisfactorily. To obtain its mean particle size, the filler is analyzed in a process of liquid phase sedimentation followed by light transmission through it (for example, with Shimadzu's SACP) or in a process of layer analysis (for example, with Shimadzu's SACD). The mean particle size of the filler is read on the cumulative particle size distribution curve obtained in the process. For the tabular inorganic filler for use herein, preferred is talc.

The formulation of the components (A) to (D) in the invention is described. In the invention, the styrenic resin of the component (B) is for improving the melt fluidity of the polycarbonate resin in the resin composition. The blend ratio of the polycarbonate resin (A) to the rubber-modified polystyrene resin (B) is such that the polycarbonate resin (A) accounts for from 70 to 95% by weight, preferably from 75 to 90% by weight, and the styrenic resin (B) accounts for from 5 to 30% by weight, preferably from 10 to 25% by weight. If the polycarbonate resin content for the component (A) is smaller than 70% by weight, the heat resistance and the mechanical strength of the moldings of the composition will be low; and if the styrenic resin content for the component (B) is smaller than 5% by weight, the moldability of the composition may be poor. For the styrenic resin (B), preferred is the above-mentioned, rubber-modified styrenic resin. The blend ratio of the resins may be suitably determined, depending on the molecular weight of the polycarbonate resin, the type, the molecular weight, the melt index and the rubber content of the styrenic resin, and the use, the size and the thickness of the resin moldings.

The phosphate compound content for the component (C) falls between 2 and 20 parts by weight, preferably between 3 and 15 parts by weight, relative to 100 parts by weight of the resin of (A) and (B). If the phosphate compound content is smaller than 2 parts by weight, the intended flame retardancy is difficult to attain; but if larger than 20 parts by weight, the heat resistance and the impact strength of the resin moldings will lower. Therefore, the phosphate compound content is determined in consideration of the desired flame retardancy of the resin moldings, comprehensively depending on the type of the phosphate compound and on the content of any other additive of rubber-like elastomer.

The tabular inorganic filler content for the component (D) falls between 0.1 and 4 parts by weight, preferably between 0.2 and 3.5 parts by weight, relative to 100 parts by weight of the resin of (A) and (B). If the filler content is smaller than 0.1 parts by weight, the aging resistance and the recyclability of the moldings will be poor; but if larger than 4 parts by weight, the impact resistance, the weld appearance and the weld strength of the moldings will be poor, and, in addition the aging resistance and the recyclability of the moldings will be also poor. As is obvious from its effect, the content of the tabular inorganic filler such as talc in the resin composition of the invention is quite different from and is smaller than that in conventional resin compositions. Specifically, the effect of the tabular inorganic filler in the resin composition of the invention is not for improving the heat resistance and the toughness of the resin moldings. Accordingly, no one knows using such a small amount of a tabular inorganic filler in resin compositions.

The flame-retardant polycarbonate resin composition of the invention may contain an additional component (E), fluoro-olefin resin for preventing resin melts from dropping when the composition is fired. For the fluoro-olefin resin (E), referred to are those described in the section of the first aspect of the invention.

The fluoro-olefin resin content of the resin composition falls between 0.05 and 5 parts by weight, preferably between 0.1 and 2 parts by weight, relative to 100 parts by weight of the resin of (A) and (B) in the composition. If the fluoro-olefin resin content is smaller than 0.05 parts by weight, the resin melt-dropping preventing ability of the composition will be not enough for the intended flame retardancy of the composition. However, even if the content is larger than 5 parts by weight, the effect of the fluoro-olefin resin added could not be augmented any more, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain from 1 to 30 parts by weight, preferably from 2 to 20 parts by weight, relative to 100 parts by weight of the total of the polycarbonate resin (A) and the styrenic resin (B), of a core/shell-type, grafted rubber-like elastomer (F). For the core/shell-type, grafted rubber-like elastomer, referred to are those described in the section of the first aspect of the invention.

The flame-retardant polycarbonate resin composition of the invention may contain, in addition to the indispensable components (A) to (D), at least one optional component selected from (E) and (F), and any other additives that are generally added to ordinary thermoplastic resins, if desired. The optional components and additives are for further improving the moldability of the composition and for further improving the impact resistance, the outward appearances, the weather resistance and the toughness of the moldings of the composition. For these, concretely referred to are those described in the section of the first aspect of the invention.

For the method of producing the flame-retardant polycarbonate resin composition of the invention, referred to are those described in the section of the first aspect of the invention. The resin composition can be produced by formulating and kneading the above-mentioned components and other optional components and additives and in a suitable ratio.

For the method of molding the flame-retardant polycarbonate resin composition of the invention, also referred to are those described in the section of the first aspect of the invention.

Injection moldings (including those molded in a mode of injection compression molding) of the flame-retardant polycarbonate resin composition of the invention are usable for various housings and parts for electric and electronic appliances, for example, those for OA appliances such as duplicators, facsimiles, personal computers, printers, telephones and information terminals; and those for other electric and electronic appliances for household use such as televisions, radios, video decks, refrigerators and microwave ovens. The moldings have still other applications, and are usable, for example, as automobile parts.

The invention is described more concretely with reference to the following Examples and comparative Examples, which, however, are not intended to restrict the scope of the invention.

Examples III-1 to III-3, and Comparative Examples III-1 to III-3

The components shown in Table III-1 were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 80° C. for 12 hours, and then molded into test pieces and articles in a mode of injection molding at 260° C. The test pieces were tested for their properties in various test methods, and their data obtained are given in Table III-1. In the Table, Example III-1 is referred to as Example 1, and the same shall apply to the other Examples and Comparative Examples.

The molding materials used herein and the methods for testing the samples produced herein are mentioned below.
(A) Polycarbonate Resin:

PC: Toughlon A1900 (from Idemitsu Petrochemical). This is a bisphenol A polycarbonate resin having an MI of 20 g/10 min (at 300° C., under a load of 1.2 kg), a viscosity-average molecular weight of 19,000, and a terminal hydroxyl ratio of 5 mol %.
(B) Styrenic Resin:
HIPS: This is a high-impact polystyrene resin (HIPS), Idemitsu PS IT44 (from Idemitsu Petrochemical) with polybutadiene graft-polymerized with polystyrene, having a rubber content of 7% by weight and an MI of 8 g/10 min (at 200° C. under a load of 5 kg).
(C) Phosphate Compound:
Resorcinol bis(diphenyl phosphate). This is a phosphate, PFR (from Asahi Denka Kogyo).
(D) Tabular Inorganic Filler:
Talc: This is FFR (from Asada Milling), having a mean particle size of 0.7 $\mu$m.
(E) Fluoro-olefin Resin:
PTFE: This is CD076 (from Asahi Glass).
(F) Rubber-like elastomer (core/shell-type, grafted rubber-like elastomer):
Composite rubber-type graft copolymer: Metablen S2001 (from Mitsubishi Rayon), having a polydimethylsiloxane content of at least 50% by weight.

Test Methods:
(1) Impact strength: IZOD (Izod impact strength):
Measured according to ASTM D256. The temperature is 23° C., and the thickness of samples is ⅛ inches. The data are in terms of kJ/m².
(2) Flame Retardancy:
Tested according to the UL94 combustion test. Samples tested have a thickness of 1.5 mm.
(3) Weld characteristics:
Using a mold into which a molding material is led through two gates, tensile strength test pieces (for weld test) are molded.
1. Weld appearance: The appearance of the welded part of the test pieces is macroscopically checked. Samples of the best appearance are the best (OO) ;those of good appearance are good (O); and those of poor appearance are poor (x).
2. Weld tensile strength: The tensile strength of the weld test pieces is measured.
3. Weld tensile strength retentiveness (%)=(tensile strength of welded part/tensile strength of non-welded part) ×100.
(4) Thermal Aging Resistance:
Molded test pieces are aged at 80° C. for 1000 hours.
1. After the heat treatment, the IZOD impact strength of the test pieces is measured.
2. Before and after the heat treatment, the color change of the test pieces is measured in terms of the color difference (ΔE), according to JIS K7105 (test method for optical properties of plastics).
(5) Moisture resistance:
Molded test pieces are aged at a temperature of 70° C. and a humidity of 90% for 1000 hours.
1. After the heat treatment, the IZOD impact strength of the test pieces is measured.
2. Before and after the heat treatment, the color change of the test pieces is measured in terms of the color difference (ΔE), according to JIS K7105 (test method for optical properties of plastics).
(6) Recyclability:
Housings for portable personal computers (of A4 size) are molded. These are ground, and 100% recycled into test pieces molded in the manner as previously.

1. The IZOD impact strength of the recycled test pieces is measured.
2. Before and after the heat treatment, the color change of the test pieces is measured in terms of the color difference (ΔE), according to JIS K7105 (test method for optical properties of plastics).

TABLE III-1

|  |  | Ex. 1 | Ex. 2 | Co. Ex. 1 | Co. Ex. 2 | Ex. 3 | Co. Ex. 3 |
|---|---|---|---|---|---|---|---|
| Constituent Ingredients | | | | | | | |
| (A) PC | | 80 | 80 | 80 | 80 | 85 | 85 |
| (B) HIPS | | 20 | 20 | 20 | 20 | 15 | 15 |
| (C) Phosphate Compound | | 10 | 10 | 10 | 10 | 10 | 10 |
| (D) Talc | | 1 | 3 |  | 5 | 3 |  |
| (E) PTFE | | 0.3 | 0.3 | 0.3 | 0.3 | 0.3 | 0.3 |
| (F) Rubber-like Elastomer | | | | | | 5 | 5 |
| Evaluation | | | | | | | |
| (1) Impact Strength | IZOD impact strength (kJ/m$^2$) | 40 | 40 | 40 | 25 | 60 | 60 |
| (2) Flame Retardancy | UL-94 (1.5 mm thick) | V-0 | V-0 | V-0 | V-0 | V-0 | V-0 |
| (3) Weld Characteristics | weld appearance | ⊚ | ○ | ○ | x | ○ | ○ |
|  | weld tensile strength (MPa) | 55 | 55 | 50 | 40 | 55 | 50 |
|  | weld tensile strength retentiveness (%) | 90 | 90 | 85 | 65 | 85 | 85 |
| (4) Thermal Aging Resistance | IZOD impact strength (kJ/m$^2$) | 35 | 40 | 30 | 20 | 45 | 35 |
|  | color change ΔE | 2 | 2 | 3 | 2 | 3 | 5 |
| (5) Moisture Resistance | IZOD impact strength (kJ/m$^2$) | 25 | 30 | 10 | 15 | 30 | 15 |
|  | color change ΔE | 3 | 3 | 6 | 2 | 5 | 7 |
| (6) Recyclability | IZOD impact strength (kJ/m$^2$) | 40 | 40 | 40 | 20 | 60 | 60 |
|  | color change ΔE | 2 | 2 | 2 | 2 | 2 | 2 |

From the results shown in Table III-1 in which the data of the impact strength and the color of the moldings of Examples are compared with those of Comparative Examples, it is obvious that the moldings of the flame-retardant polycarbonate resin composition of the invention have good thermal aging resistance, wet heat resistance and recyclability. In addition, the moldings have good flame retardancy and impact resistance. In particular, the core/shell-type, grafted rubber-like elastomer in the resin composition is effective for further improving the aging resistance, especially the impact resistance of the moldings of the composition.

INDUSTRIAL APPLICABILITY

Containing no halogen, moldings of the flame-retardant polycarbonate resin composition of the invention have good flame retardancy, good impact strength and good heat-resistant stability, and have good thermal aging resistance and wet heat resistance. As having such good thermal stability, the moldings are recyclable. Therefore, the resin composition of the invention contributes toward solving environmental problems with plastics and saving natural resources. When a styrenic resin and a rubber-like elastomer are added to the resin composition, they are effective for further improving the moldability and the impact strength of the composition and its moldings, not interfering with the durability of the moldings. Even when the moldings are colored in dark color, they have good surface gloss and surface layer peeling resistance, and their weld appearance and weld tensile strength are good. Even when the phosphate compound in the resin composition is not a specific phosphate compound of good hydrolysis resistance, the moldings of the composition are still good, having good thermal stability and recyclability. As the moldings of the resin composition are well recyclable, they contribute towards solving environmental problems with plastics and saving natural resources. Accordingly, the moldings of the resin composition of the invention are well applicable to large-sized, thin-walled electric and electronic appliances and automobile parts, especially OA appliances and electric and electronic appliances for household use, and their applications will further expand in future.

What is claimed is:
1. A flame-retardant polycarbonate resin composition, comprising:
   (A) from 30 to 95% by weight of a polycarbonate resin; and
   (B) from 70 to 5% by weight of a styrenic resin; and
   (C) from 1 to 30 parts by weight, relative to 100 parts by weight of the resin of (A) and (B), of a phosphate compound;
      wherein an amount of phenols of said resin composition extracted in a Soxhlet extraction with a solvent of acetone is at most 300 ppm.
2. The flame-retardant polycarbonate resin composition as claimed in claim 1, wherein a ratio of terminal hydroxyl groups to the terminals of the polycarbonate resin is between 0.5 and 20 mol %.
3. The flame-retardant polycarbonate resin composition as claimed in claim 1, wherein the resin comprises from 20 to 95% by weight of the polycarbonate resin (A) and from 5 to 80% by weight of a rubber-modified styrenic resin for the component (B).
4. The flame-retardant polycarbonate resin composition as claimed in claim 1, further comprising (D) from 0.02 to 5 parts by weight, relative to 100 parts by weight of the resin (A) and (B), of a fluoro-olefin resin.
5. The flame-retardant polycarbonate resin composition as claimed in claim 1, further comprising (E) from 0.2 to 30 parts by weight, relative to 100 parts by weight of the resin (A) and (B), of a core/shell grafted rubber elastomer.
6. A molding of the flame-retardant polycarbonate resin composition of claim 1.

7. An injection molding of the flame-retardant polycarbonate resin composition of claim 1, for housings or parts of electric and electronic appliances.

8. A flame-retardant polycarbonate resin composition, comprising:
   (A) from 60 to 99% by weight of a polycarbonate resin; and
   (B) from 1 to 40% by weight of a rubber-modified polystyrene resin; and
   (C) from 1 to 30 parts by weight, relative to 100 parts by weight of the resin of (A) and (B), of a phosphate compound;
      wherein the rubber-modified polystyrene resin (B) has (a) an area-average rubber particle size of from 0.1 to 2.5 $\mu$m, (b) a swelling index of from 10 to 20, and (c) a gel content of from 15 to 25% by weight.

9. The flame-retardant polycarbonate resin composition as claimed in claim 8, further comprising (D) from 0.02 to 5 parts by weight, relative to 100 parts by weight of the resin (A) and (B), of a fluoro-olefin resin.

10. The flame-retardant polycarbonate resin composition as claimed in claim 8, further comprising (E) from 0.2 to 30 parts by weight, relative to 100 parts by weight of the resin (A) and (B), of a core/shell grafted rubber-elastomer.

11. A molding of the flame-retardant polycarbonate resin composition of claim 8.

12. An injection molding of the flame-retardant polycarbonate resin composition of claim 8, for housings or parts of electric and electronic appliances.

13. The molding as claimed in claim 11, of which an L value of the surface is at most 80.

14. A flame-retardant polycarbonate resin composition, comprising:
   (A) from 70 to 95% by weight of a polycarbonate resin; and
   (B) from 5 to 30% by weight of a styrenic resin; and
   (C) from 2 to 20 parts by weight, relative to 100 parts by weight of the resin of (A) and (B), of a phosphate compound; and
   (D) from 0.1 to 4 parts, relative to the same, of talc.

15. The flame-retardant polycarbonate resin composition as claimed in claim 14, wherein the talc has a mean particle size of from 0.2 to 2 $\mu$m.

16. The flame-retardant polycarbonate resin composition as claimed in claim 14, wherein the phosphate compound is a condensed phosphate compound having a resorcinol or hydroquinone structure and a phenylene-ether structure.

17. The flame-retardant polycarbonate resin composition as claimed in claim 14, further comprising (E) from 0.05 to 5 parts by weight, relative to 100 parts by weight of the resin (A) and (B), of a fluoro-olefin resin.

18. The flame-retardant polycarbonate resin composition as claimed in claim 14, further comprising (F) from 1 to 30 parts by weight, relative to 100 parts by weight of the resin (A) and (B), of a core/shell grafted rubber elastomer.

19. A molding of the flame-retardant polycarbonate resin composition of claim 14.

20. An injection molding of the flame-retardant polycarbonate resin composition of claim 14, for housings or parts of electric and electronic appliances.

21. The molding as claimed in claim 12, of which an L value of the surface is at most 80.

* * * * *